No. 642,051. Patented Jan. 23, 1900.
J. J. McDONALD.
PNEUMATIC TIRE.
(Application filed Oct. 25, 1899.)
(No Model.)
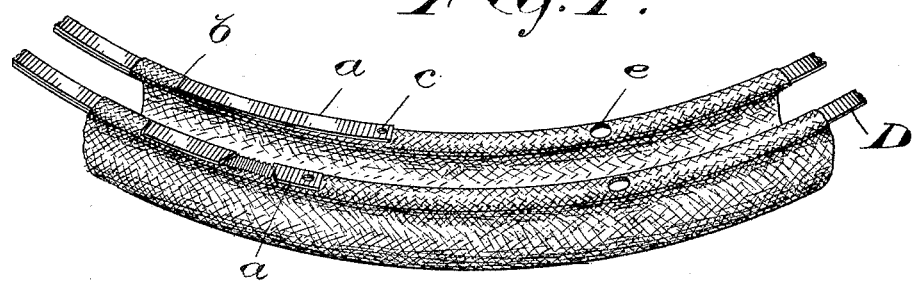
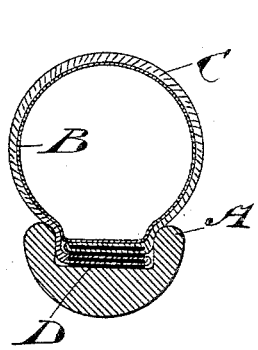
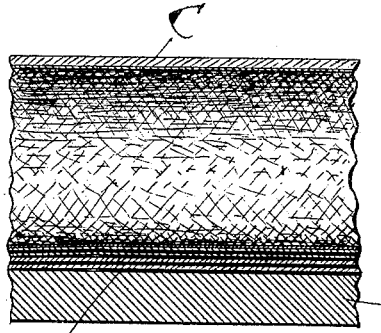
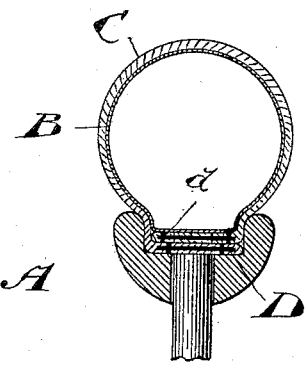
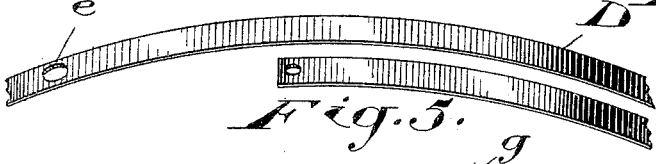
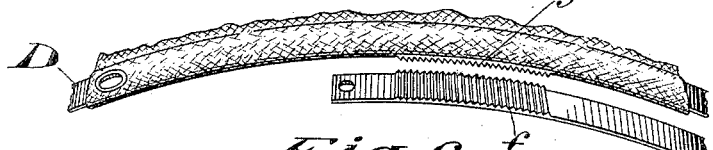
Witnesses
J. J. Colbourne.
J. W. Webster.
Inventor
John J. McDonald
by
Ridout & Murphee
Attys

UNITED STATES PATENT OFFICE.

JOHN JAMES McDONALD, OF CARDIFF, ENGLAND, ASSIGNOR TO THOMAS JOHN ROGERS, OF BRANTFORD, AND EDWARD JAMES WHYTE, LUCIUS NORMAN VAN STONE, AND GEORGE RICHARD WILLIAM ROGERS, OF TORONTO, CANADA.

PNEUMATIC TIRE.

SPECIFICATION forming part of Letters Patent No. 642,051, dated January 23, 1900.

Application filed October 25, 1899. Serial No. 734,773. (No model.)

*To all whom it may concern:*

Be it known that I, JOHN JAMES MCDONALD, machinist, of No. 142 Broadway, in the town of Cardiff, in the county of Glamorgan, Wales, England, have invented a certain new and useful Improvement in Pneumatic Tires, of which the following is a specification.

The objects of my invention are to devise a tire which can be fitted to any grooved rim of a size coming within the margin of possible expansion and contraction of the tire, to perfectly protect the inner tube from the possibility of puncture by the spokes projecting through the rim, and, further, to so secure the tire to the rim that it will not come off when only partly inflated.

With these objects in view my invention consists, essentially, in providing each edge of the outer cover with a flat metallic band inserted in a pocket therein, each band being provided with overlapping ends, one of which extends out through a slot in the edge of the cover. These bands are preferably of substantially the same width as the recess in the rim, and by drawing on their protruding ends they may be tightened down in the recess, one on top of the other, so as to effectually hold the tire and give the advantages indicated.

My invention further consists in such details of construction as are hereinafter more specifically described and then definitely claimed.

Figure 1 is a perspective view of a portion of an outer cover constructed in accordance with my invention. Fig. 2 is a longitudinal section of a portion of the tire secured upon a rim. Fig. 3 is a cross-section of my improved tire, taken at the place where the ends of a band overlap. Fig. 4 is a similar view taken at the valve. Fig. 5 is a perspective view of the ends of a band. Fig. 6 is a similar view showing corrugations on an edge of the outer cover and the end of a band.

In the drawings like letters of reference indicate corresponding parts in the figures.

A is a rim, grooved as indicated.

B is the inner tube of the tire, and C the outer cover. Within each edge of this cover is formed a pocket through which is run a flat metal band D, preferably formed of an aluminium alloy for the sake of lightness. One end $a$ of each band projects out through a slot $b$, formed in the edge of the outer cover, and is provided with a hole $c$, with which a suitable hook may be engaged when the tire is being placed in position. The other end $d$ of each band is preferably secured in any suitable manner to the edge of the cover. (See Fig. 2.) The inner tube B is provided with the usual valve E, which passes through holes $e$, formed in the bands D.

When it is desired to place the tire upon the rim, I place the inner tube B within the cover, at the same time passing the valve E through the holes $e$ in the bands D and also, of course, through the usual hole in the rim. The lower band D is then tightened upon the bottom of the recess in the rim by engaging a suitable tool with the hole $c$ and drawing the end $a$ farther through the slot $b$. By repeating the process with the upper band D it is tightened down upon the lower band, and the tire is now ready for inflation. The air-pressure in the inner tube presses the ends $a$ of the bands so tightly against the parts above and below them that slipping is impossible, and the tire is as firmly secured to the rim as if the ends $a$ were rigidly fastened. To further provide against any possibility of the ends $a$ slipping, I prefer to roughen or corrugate them, as shown in Fig. 6 at $f$, and at the same time provide the adjacent portions of the edges of the cover with corrugations $g$, formed on or connected thereto.

When it is desired to remove the tire from the rim, it is merely necessary to deflate the tire and extend the bands by drawing upon the edges of the cover until they are sufficiently increased in circumference to pass over the edges of the rim.

From the above description it will be seen that I have devised a tire which can be readily secured to any grooved rim, which will fit rims of different diameters within certain easily-defined limits, which will very securely hold the tire in position without the necessity of any mechanical connection to the rim, which will securely hold the tire in place even though the tire be partly deflated, and which will completely protect the inflated tube from all danger of puncture by the spokes or the nipples connecting them to the rim.

What I claim as my invention is—

1. In a tire a grooved rim and an outer cover having pockets formed in each edge thereof in combination with two metallic bands, one in each pocket, each band having a fixed end and a free end extending out of the under side of the edge of the cover through a slot therein, substantially as and for the purpose specified.

2. In a tire a grooved rim; an inner tube provided with a valve, and an outer cover having pockets formed in each edge thereof in combination with two metallic bands one in each pocket, each band having an end extending out of the under side of the cover through a slot therein, and each band having a hole for the passage of the valve formed therein toward its other end but clear of the aforesaid extended end, substantially as and for the purpose specified.

3. In a tire a grooved rim; an inner tube provided with a valve and an outer cover having pockets formed in each edge thereof in combination with two metallic bands, one in each pocket, each with overlapping ends, one of which extends out through a slot in the under side of the edge of the cover while the other end has a hole formed therein for the passage of the valve, clear of the aforesaid extended end substantially as and for the purpose specified.

4. In a tire a grooved rim; an inner tube provided with a valve; and an outer cover having pockets formed in each edge thereof in combination with a metallic band located in each pocket and having an end extending out through a slot in the under side of the edge of the cover and roughened or corrugated on its upper surface, the edge of the cover in contact therewith being also roughened or corrugated, while the other end of the band has a hole formed therein for the passage of the valve clear of the aforesaid extended end, substantially as and for the purpose specified.

5. In a tire a grooved rim; an inner tube provided with a valve; and an outer cover having pockets formed in each edge thereof in combination with a metallic band with overlapping ends located in each pocket and having an end extending out through a slot in the under side of the edge of the cover and roughened or corrugated on its upper surface, the edge of the cover in contact therewith being also roughened or corrugated, while the other end of the band has a hole formed therein for the passage of the valve clear of the aforesaid extended end, substantially as and for the purpose specified.

6. In a tire a grooved rim; an inner tube provided with a valve; and an outer cover having pockets formed in each edge thereof in combination with a metallic band located in each pocket and having an end extending out through a slot in the under side of the edge of the cover and roughened or corrugated on its upper surface, the edge of the cover in contact therewith being also roughened or corrugated, while the other end of the band is secured within the pocket and has a hole formed therein for the passage of the valve clear of the aforesaid extended end, substantially as and for the purpose specified.

7. In a tire a grooved rim; an inner tube provided with a valve; and an outer cover having pockets formed in each edge thereof in combination with a metallic band with overlapping ends located in each pocket and having an end extending out through a slot in the under side of the edge of the cover and roughened or corrugated on its upper surface, the edge of the cover in contact therewith being also roughened or corrugated, while the other end of the band is secured within the pocket and has a hole formed therein for the passage of the valve clear of the aforesaid extended end, substantially as and for the purpose specified.

8. In a tire a grooved rim; an inner tube provided with a valve, and an outer cover having pockets formed in each edge thereof in combination with two metallic bands one in each pocket, each band having an end with a hole therein extending out of the under side of the cover through a slot therein, and each band having a hole for the passage of the valve formed therein toward its other end but clear of the aforesaid extended end, substantially as and for the purpose specified.

Dated at the town of Cardiff, Wales, England, the 13th day of September, 1899.

JOHN JAMES McDONALD.

Witnesses:
HUGH M. INGLEDEW,
ISAAC WATKINS.